FUEL PUMP

Original Filed Sept. 10, 1962

INVENTOR.
VERNON D. ROOSA

BY Lindsey, Prutzman and Hayes
ATTORNEYS

United States Patent Office

Re. 27,563
Reissued Jan. 23, 1973

27,563
FUEL PUMP

Vernon D. Roosa, Hartford, Conn., assignor to Stanadyne, Inc., Wilson, Conn.

Original No. 3,204,561, dated Sept. 7, 1965, Ser. No. 222,553, Sept. 10, 1962. Application for reissue Feb. 1, 1971, Ser. No. 111,562
Int. Cl. F04b *19/02*
U.S. Cl. 417—462 14 Claims

Matter enclosed in heavy brackets [ ] appears in the original patent but forms no part of this reissue specification; matter printed in italics indicates the additions made by reissue.

The present invention relates to fuel pumps and more particularly to a novel and improved check valve arrangement for a fuel pump of the type employed for delivering a uniform and consistent measured amount of fuel to each of the cylinders of an internal combustion engine.

An object of the present invention is to provide an improved fuel pump incorporating a rotor mounted check valve in the inlet fuel line of the injection thereof.

A further object of the invention is to provide a check valve arrangement that is simple and efficient and may be easily adjusted with a high degree of accuracy.

Another object of the invention is to provide a novel arrangement for maintaining the adjustment of the check valve in its precisely adjusted position.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
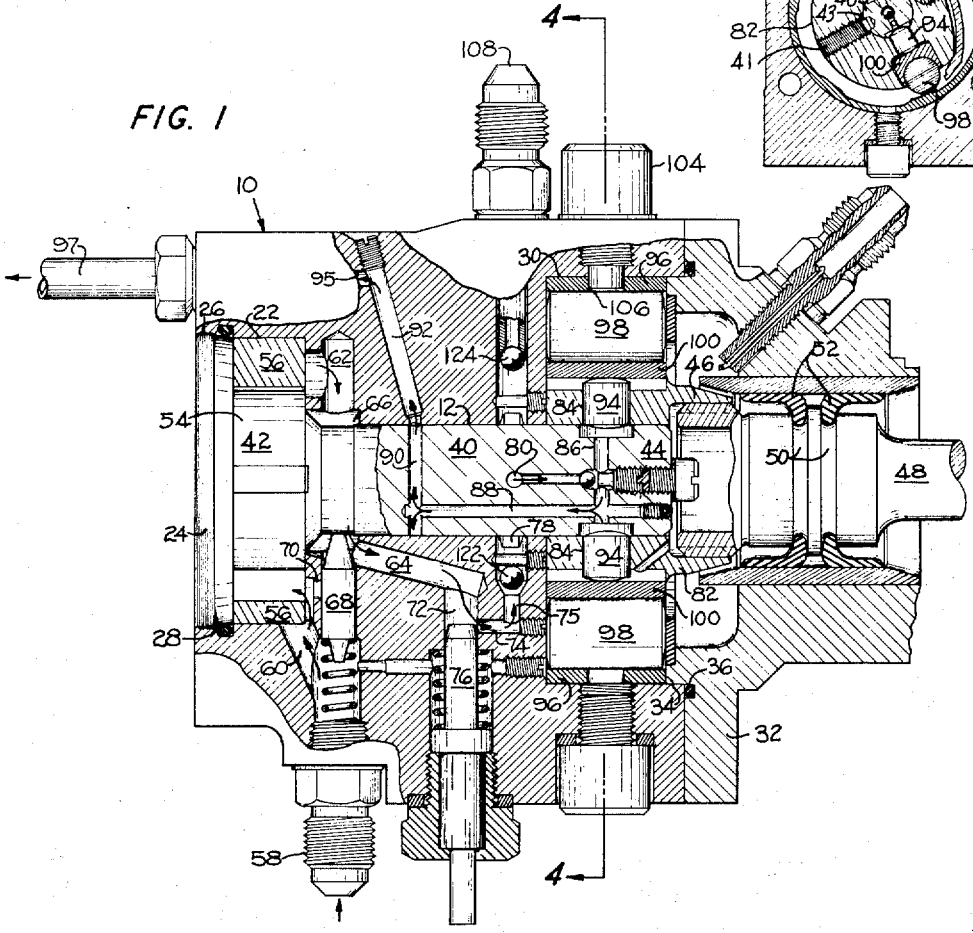
FIG. 1 is a fragmentary and partly diagrammatic view of a fuel pump embodying the present invention.

Referring to FIG. 1 of the drawing, there is shown an exemplary fuel pump having a generally cylindrical pump body or stator 10 having a relatively large axial opening or bore 12. The left-hand end of the body, as viewed in FIG. 1, is provided with an enlarged counterbore 22 which is closed by an end plate 24 fastened to the end of the pump body 10 by any suitable means such as the threaded engagement shown at 26. End plate 24 is provided with a tapered end portion which is sealed to the pump body 10 by an O ring 28. The right-hand end of the body 10, as viewed in FIG. 1, is also provided with an enlarged counterbore 30 which is closed by an end plate 32 which engages the end of the bore 30 with a rabbit fit as indicated at 34, and is sealed thereto by O ring 36. End plate 32 may be secured to the body 10 by any suitable means (not shown).

Disposed within the central bore 12 and rotatably mounted therein is a cylindrical fuel distributing rotor 40 having a fuel pickup or transfer pump 42 on one end thereof and a charge or injection pump 44 on the other end thereof. Fixed and indexed on one end of the fuel distributing rotor 40 by a lock screw 41 having a tapered end 43 which engages a mating tapered seat is a splined coupling 46 for connection to a shaft 48 which may be driven by the engine with which the fuel pump is associated. Shaft 48 is provided with annular grooves

50 which are sealed to end plate 32 by annular sealing members 52.

The fuel pickup pump or transfer pump 42 of the illustrated embodiment is of the sliding vane type. The pump comprises a rotor 54 which rotates with the fuel distributing rotor and in an eccentric stator 56 surrounding the rotor and non-rotatably disposed within the counterbore 22. A fuel inlet to the transfer pump 42 is provided by the threaded fitting 58 which is connected to a supply of fuel, not shown, and communicates with the transfer pump by a diagonal passageway 60 disposed in the housing 10 as indicated by the arrows. The transfer pump increases the pressure on the fuel in proportion to the speed of the rotor and discharges it into passageway 62 which communicates with a generally longitudinal passageway 64 in the housing 10 through annular channel 66 surrounding the fuel distributing rotor 40. A spring-biased pressure relief valve 68 is interposed between annular channel 66 and the inlet to the transfer pump 42 by port 70 to limit the outlet pressure of the fuel being discharged by the transfer pump to a desired maximum.

The longitudinal passageway 64 communicates with a radial passageway 72 in housing 10 which, in turn, communicates with a longitudinal passageway 74 past a metering valve 76. The passageway 74 in turn communicates with an annular groove 78 provided in the bore 12 through radial passageway 75. Annular groove 78 is axially aligned with inlet port 80 of the fuel distributing rotor 40. Thus, it will be apparent that inlet port 80 of the fuel distributing rotor 40 continuously communicates with the annular passage 78 as the fuel distributing member is rotated. It will be also apparent that such continuous communication could be obtained by the provision of an annular groove in rotor 40 with the radial passageway 75 terminating in a port.

As indicated above, a charge pump 44 is provided on the right-hand end of the fuel distributing rotor 40. As shown, the charge pump comprises an enlarged cylindrical pump carrier 82 positioned around the end of the fuel distributing rotor 40 and secured and indexed or located thereon by an interference fit and a set screw 41. The enlarged cylindrical pump carrier is provided with enlarged transverse apertures forming cylinders 84 in which pistons 94 are positioned. Cylinders 84 are aligned to provide communication with the passageway 86 of the fuel distributing rotor 40. The passageway 86 in turn communicates with an axially disposed discharge passageway 88 to receive the high pressure fuel discharged by the charge pump 44. Axial passageway 88 in turn communicates with transverse passageway 90 which terminates in ports on the cylindrical surface of the fuel distributing rotor 40. These ports lie in the same radial plane in bore 12 as the ports of the diagonal passageways 92 of the housing 10 which are so positioned about the periphery of the bore 12 as to communicate in sequence with the outlet ports of the passageway 90 of the fuel distributing rotor 40 as the rotor is rotated. Each of diagonal passageways 92 are connected to the various cylinders (not shown) of the engine to which fuel is being pumped by means of axial passageways 95 which are respectively connected to the cylinders by external tubes 97. While only one diagonal passageway 92 is shown, it will be apparent that the one such passageway will be provided for each cylinder of the associated engine and the respective ports thereof will be uniformly spaced about the bore 12 so as to be in registry with ports of passageways 90 as the rotor is rotated in timed relation with the engine.

In the illustrated embodiment, the transverse rotor passageway 90 is shown as having two discharge ports ositioned at diametrically opposed points on the periphery f the fuel distributing rotor 40. It will be apparent that he use of these two ports will result in communication etween the passageway 90 and each of the outlets pasageways 92 twice for each revolution of the fuel distributing rotor 40. Thus, it is only necessary to rotate the uel distributing rotor 40 at one-half the speed required f only one such port were utilized.

Figure 4:
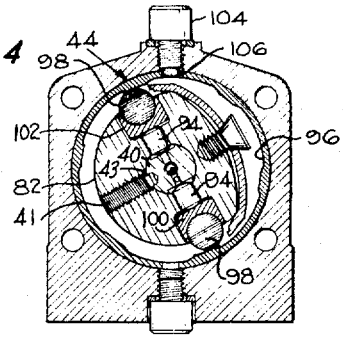
FIG. 4 is a cross-sectional view taken along the line 4—4 of FIG. 1.

As indicated above, the charge pump 44 comprises ransverse passageways 86 having enlarged cylinder porions 84 in which a pair of pistons 94 are positioned. istons 94 are actuated inwardly as the fuel distributing otor is rotated in timed relation to the associated engine nd actuation of the pistons is effected by means of an nnular cam 96 through intermediate rollers 98 which re positioned in roller shoes 100. As shown, cam 96 is on-rotatably secured by a set screw 104 which is received n a hole 106 in cam 96. As best shown in FIG. 4, shoes 00 are slidably mounted in radial slots 102 in the cylinlrical carriage 82 and the cam 96 is so constructed and rranged that the pair of piston 94 and their associated ollers 98 and shoes 100 move inwardly and outwardly imultaneously.

A nipple 108 is provided for the installation of a hand riming pump (not shown) which is used to provide uel for injection into the cylinders of the associated ngine during the starting of the engine when the rotor peed is low.

In order to provide a unidirectional flow of the inlet uel to the charge pump, there is provided a check value 10. As shown, the check valve 110 comprises a ball vhich is mounted in the rotor 40 to engage a tapered valve seat 112. In axial alignment with the valve seat s a threaded opening 114 which is adapted to receive n adjustable stop screw 116. The amount of longitulinal movement of the ball 110 with respect to valve eat 112 may be adjusted by adjusting the clearance of he stop screw 116 and the ball 110. The clearance beween the ball 110 and its valve seat should be large enough to let sufficient fuel pass therethrough during the hort interval of time that the pistons 94 of the charge ump 44 are moving outwardly and sufficiently small hat the ball is not damaged by hammering against the valve seat and the stop. In addition, it is desirable to rovide a maximum speed setting limit for the pump, nd the check valve arrangement of this invention may e used to provide such a limit. For example, by properly electing the amount of travel of the ball 110 betweents seat 112 and its stop 116, the amount of fuel which an pass therethrough for a given pump construction may e limited to provide an engine speed of say, about 2,000 evolutions per minute. Because of the importance of the djustment to achieve this result, the adjustment of the ravel of the ball must be very precisely adjusted, and he setting, when so adjusted, must not change.

This invention provides an arrangement for achieving uch a desirable adjustment.

Referring to FIG. 1, it will be observed that the slot n the head of the stop screw 116 is accessible through he shaft end of the pump when the shaft 48 is removed. Thus, by the use of a screwdriver the stop screw may be urned inwardly until it rests tightly against the ball with he ball in seated position. Using the slot in the top of he screw as an indicator, the stop screw 116 may be nscrewed, say, one-half turn, to obtain a very precise djustment in the setting of the stop. If, for example, a 0–56 stop screw is used, such an adjustment will provide clearance of 9 mils.

Figure 3:
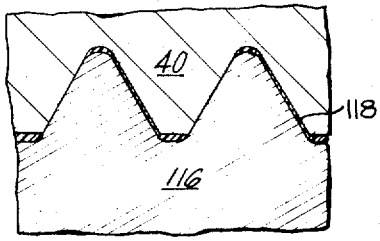
FIG. 3 is a further enlarged fragmentary view of the locking means incorporated in the present invention for maintaining the precise adjustment of the invention.
Figure 2:
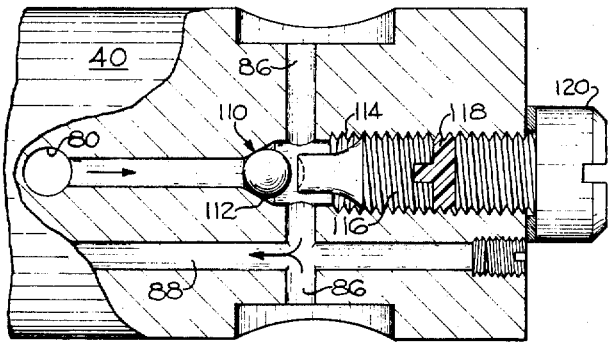
FIG. 2 is an enlarged fragmentary view, partly in cross section, showing details of the check valve arrangement of this invention.

It is apparent that some means must be provided to ock the stop screw in its adjusted position. It is further pparent that a conventional locking screw which engages he stop screw 116 may rotate it somewhat to change ts setting, a condition which could not be observed. In ccordance with another aspect of this invention, there s provided a means for locking the stop screw 116 in place in such a manner that it is not engaged by a rotating locking device. To accomplish this objective a quantity of flowable, settable material 118, such as an epoxy resin, is placed in the threaded opening. A second screw 120 is then threaded into the opening and acts a a hydraulic press to force the resin in between the threads of stop screw 116, as best shown in FIG. 3. The threaded portion of the locking screw 120 is shorter than the distance from the end of the locking screw to the end surface of the rotor 40, and, therefore, will not engage the end of the locking screw to change its adjustment. The resin 118 thus positioned in the threads, as shown in FIG. 3, sets, or is treated so as to cause it to set, to lock the stop screw 116 in place.

In operation, when it is desired to start the engine with which the injector pump of this invention is associated, the shaft 43 may rotate at a slow speed so that the injector pump may not provide a sufficient pressure to facilitate the starting of the engine. Under such conditions, a hand primer (not shown) connected to the coupling 108 may be utilized to provide the high pressure fuel which is intjected into the cylinders of the engine as the ports of the transverse passageway 90 sequentially come into registry with the respective diagonal passageways 92 of the pump as the rotor 40 is rotated in timed relationship with the engine. It will be observed that the outlet of this primer communicates directly with annular groove 78 thus bypassing the transfer pump 42 to avoid the restriction to fuel which would otherwise result.

In order to prevent the fuel discharged from the primer from flowing past the metering valve toward the transfer pump and, hence, have the pressure thereof dissipated, a check valve 122 is provided in radial conduit 75 to prevent this reverse flow during the priming operation.

As soon as the engine starts and the shaft speed increases, the fuel pressure from the transfer pump 42 increases to a level where priming is no longer necessary. The fuel will then move the ball of the check valve 122 off the seat and will cause the ball 124 of the primer conduit to become seated to prevent leakege. The fuel, as pressurized by the transfer pump and metered in accordance with the setting of the metering valve 76, enters the annular channel 78 and the inlet passageway 80 of the fuel distributing rotor 40, and as the pistons 94 move outwardly between charging strokes, it will enter the transverse passageway 86 of the charge pump. As the fuel distributing rotor continues to rotate, the rollers 98 will engage the came lobes of the cam 96 to be urged inwardly to highly compress the fuel in the transverse passageway 86. This increased pressure relative to the transfer pump pressure will also cause the ball check valve 110 to become seated to prevent reverse flow of fuel in the direction of the transfer pump 42. Since the ports of the passageways 92 are positioned about the wall of bore 12 of the housing 10 so as to be sequentially in registry with a port of the transverse passage 90 of the fuel distributing rotor 40, a metered amount of fuel under high pressure is sequentially injected into the cylinders of the associated engine.

From the foregoing, it will be apparent that the placement of the check valve 110 for the inlet fuel to the charge pump in the rotor isolates the high pressure fuel produced by the charge pump 44 from the junction of the passageways 78 and 80 at which point the inlet fuel to the charge pump enters the rotor. This construction makes possible the use of an annular groove 78 at this point for transferring fuel from the stator 10 to the rotor 40 and thereby eliminates the problem of timing the coincidence of these two ports which would otherwise be required to minimize fuel leakage at this junction if the position of the cam ring 96 is changed to adjust the time of injecting fuel into the cylinders of the engine. In addition, the provision of an annular groove 78 rather than a port of limited peripheral extent makes it possible to feed fuel to the charge pump at all times during which the pistons 94 are moving outwardly. This minimizes the problems which would otherwise result from changes in viscosity of the fuel.

In addition, it will be apparent that the check valve arrangement for the inlet fuel provides a simple and easy manner in which the maximum speed of the engine may be set independently of the metering valve, and that the invention provides a manner of precisely locking a stop screw in adjusted position.

As will be apparent to persons killed in the art, various modifications and adaptations of the structure above described will become readily apparent without departure from the spirit and scope of the invention, the scope of which is defined in the appended claims.

I claim:

1. A fuel pump comprising a casing having inlet and outlet passages, a bore in said casing, a fuel distributing rotor [positioned] *journaled* in said bore and *defining with said bore an annulus intermediate the ends of said bore for receiving fuel from the inlet passage of said casings, said rotor* having fuel inlet port means adapted to communicate with said [inlet passage] *annulus* and outlet ports means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet port means and to eject fuel to said outlet port means, and means carried by said rotor and positioned between said inlet port means and said piston means to prevent the reverse flow of fuel therethrough.

2. A fuel pump comprising a casing having inlet and outlet passages, a bore in said casing, a fuel distributing rotor positioned in said bore and having a fuel inlet passage terminating in a port on the cylindrical surface thereof and positioned to communicate with a port of said fuel inlet passage of said casing, one of said ports comprising an annular groove to provide continuous communication between said inlet passages, and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, and a one-way valve carried by said rotor and positioned between the inlet port thereof and said piston means to prevent the reverse flow of fuel therethrough.

3. A fuel pump comprising a casing having inlet and outlet passages, a bore in said casing, a fuel distributing rotor [positioned] *journaled* in said bore and having an axial fuel inlet passage terminating in a port on the cylindrical surface thereof positioned to communicate with a port of the fuel inlet passage of said casing, *one of said ports comprising an annular groove intermediate the ends of said bore,* and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, *means for regulating the amount of fuel delivered to said annulus,* and means carried by said rotor and positioned between the inlet port thereof and said piston means to prevent the reverse flow of fuel therethrough.

4. A fuel pump comprising a casing having inlet and outlet passages, a bore in said casing, a fuel distributing rotor [positioned] *journaled* in said bore and having an axial fuel inlet passage terminating in a port on the cylindrical surface thereof positioned to communicate with a port of the fuel inlet passage of said casing, *one of said ports comprising an annular groove intermediate the ends of said bore,* and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet ports means, *means for metering the fuel delivered to said annulus,* a check valve carried by said rotor and positioned between the inlet port thereof and said piston means to prevent the reverse flow of fuel therethrough, and a stop for the check valve to limit the axial movement thereof.

5. A fuel pump comprising a casing having inlet and outlet passages, a bore in said casing, a fuel distributing rotor positioned in said bore and having an axial fuel inlet passage terminating in a port on the cylindrical surface thereof positioned to communicate with a port of the fuel inlet passage of said casing, and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, a check valve carried by said rotor and positioned between the inlet port thereof and said piston means to prevent the reverse flow of fuel therethrough, a threaded opening in the end of said fuel distributing rotor in alignment with the axial inlet passage thereof, and a set screw positioned in said threaded opening to limit the maximum rate at which fuel can pass by said check valve whereby the maximum speed of the engine with which the fuel pump is associated may be limited.

6. A fuel pump comprising a casing having inlet and outlet passages, a bore in said casing, a fuel distributing rotor positioned in said bore and having an axial fuel inlet passage terminating in a port on the cylindrical surface thereof positioned to communicate with a port of the fuel inlet passage of said casing, and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, a ball check valve carried by said rotor and positioned between the inlet port thereof and said piston means to prevent the reverse flow of fuel therethrough, a threaded opening in the end of said fuel distributing rotor in alignment with the axial inlet passage thereof, and a set screw positioned in said threaded opening to limit the maximum rate at which fuel can pass by said ball check valve, and means for locking the set screw in its adjusted position.

7. A fuel pump comprising a casing having inlet and outlet passages, a bore in said casing, a fuel distributing rotor positioned in said bore and having an axial fuel inlet passage terminating in a port on the cylindrical surface thereof positioned to communicate with a port of the fuel inlet passage of said casing, and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, a ball check valve carried by said rotor and positioned between the inlet port thereof and said piston means to prevent the reverse flow of fuel therethrough, a threaded opening in the end of said fuel distributing rotor in alignment with the axial inlet passage thereof, and a set screw positioned in said threaded opening to limit the maximum rate at which fuel can pass by said ball check valve, and means for placing a settable material between the threads of said adjustable stop member and said bore for locking the stop member in its adjusted position.

8. A fuel pump comprising a casing having inlet and outlet passages, a bore in said casing, a fuel distributing rotor positioned in said bore and having fuel inlet port means adapted to communicate with said inlet passage and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet port means and to eject fuel to said outlet port means, a one-way valve carried by said rotor and positioned between said inlet port means and said piston means to prevent the reverse flow of fuel therethrough, and an auxiliary fuel passage in said casing communicating with the fuel inlet passage of said opening and a one-way valve in said inlet passage of said casing to prevent the reverse flow of fuel therethrough when fuel is being supplied through the auxiliary passage.

9. A fuel pump comprising a casing having inlet and outlet passages, a bore in said casing, a fuel distributing rotor positioned in said bore and having fuel inlet port means adapted to communicate with said inlet passage and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet port means and to eject fuel to said outlet port means, and a one-way valve carried by said rotor and positioned between said inlet port means and said piston means to prevent the reverse flow of fuel therethrough, an auxiliary fuel passage in said casing communicating with the fuel inlet passage of said opening and a one-way valve in said inlet passage of said casing to prevent the reverse flow of fuel therethrough when fuel is being supplied through the auxiliary passage, and a one-way valve in said auxiliary fuel passage to prevent the reverse flow of fuel therethrough during normal operation.

10. A fuel pump comprising a casing having inlet and outlet passages, a bore in said casing, a fuel distributing rotor positioned in said bore and having an axial fuel inlet passage terminating in a port on the cylindrical surface thereof positioned to communicate with a port of the fuel inlet passage of said casing, and outlet port means adapted to communicate in sequence during the rotation of said rotor with said outlet passages of said casing to permit alternate admission and discharge of fuel from the interior of said rotor, piston means carried by said rotor and operable in response to the rotation thereof to receive fuel from the inlet passage of said rotor and to eject fuel to said outlet port means, a check valve carried by said rotor and positioned between the inlet port thereof and said piston means to prevent the reverse flow of fuel therethrough and a threaded opening in the end of said fuel distributing rotor in alignment with the axial fuel inlet passage thereof, and a set screw positioned in said threaded opening providing an adjustable stop to limit the movement of said check valve, and hydraulic pressure-applying means for forcing a settable material between the threads of said set screw and said bore for locking the stop member in its adjusted position without transmitting rotational forces thereto.

11. A fuel pump as recited in claim 10 wherein the hydraulic pressure-applying means is a second set screw threaded in said threaded opening.

*12. The fuel pump of claim 1 wherein said means for preventing reverse flow of fuel is a one-way valve having means for minimizing the impact of the valve against its valve seat.*

*13. The fuel pump of claim 12 including metering means to control the fuel delivered to said annulus.*

*14. The fuel pump of claim 3 wherein said means for preventing reverse flow of fuel is a one-way valve having means for minimizing the impact of the valve against its valve seat.*

References Cited

The following references, cited by the Examiner, are of record in the patented file of this patent or the original patent.

UNITED STATES PATENTS

| | | | |
|---|---|---|---|
| 2,946,292 | 7/1960 | Chmielechi | 417—441 |
| 2,989,003 | 6/1961 | Evans | 417—462 |
| 2,784,708 | 3/1957 | Hill et al. | 417—206 |
| 2,092,341 | 9/1937 | De Vries | 85—2.4 |
| 2,132,667 | 10/1938 | Wilson | 151—14.5 |
| 2,223,755 | 12/1940 | Dillstrom | 103—2.1 |
| 2,766,080 | 10/1956 | Fineran | 151—7 |
| 2,831,473 | 4/1958 | Liardet | 103—2.1 |
| 2,869,529 | 1/1959 | Oxenfart et al. | 123—140 |
| 2,935,062 | 5/1960 | Aldinger et al. | 103—2.1 |
| 2,939,805 | 6/1960 | Johnson | 151—7 |
| 2,947,299 | 8/1960 | Shallenberg et al. | 123—140 |
| 2,980,092 | 4/1961 | Dreisin et al. | 123—139 |

FOREIGN PATENTS

| | | | |
|---|---|---|---|
| 1,053,245 | 3/1959 | Germany | 417—462 |
| 8,026 | 4/1912 | Great Britain. | |
| 8,198 | 4/1945 | Great Britain. | |
| 339,436 | 8/1959 | Switzerland. | |

WILLIAM L. FREEH, Primary Examiner